(12) United States Patent
Yu et al.

(10) Patent No.: US 8,778,237 B2
(45) Date of Patent: Jul. 15, 2014

(54) MOLD FOR FORMING OPTICAL FIBER CONNECTOR

(75) Inventors: Tai-Cherng Yu, Taipei Hsien (TW); I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 702 days.

(21) Appl. No.: 12/965,899

(22) Filed: Dec. 12, 2010

(65) Prior Publication Data

US 2011/0278749 A1 Nov. 17, 2011

(30) Foreign Application Priority Data

May 17, 2010 (TW) .............................. 99115630 A

(51) Int. Cl.
*B29D 11/00* (2006.01)
(52) U.S. Cl.
USPC ........................................................ 264/1.24
(58) Field of Classification Search
USPC ........................................................ 264/1.24
See application file for complete search history.

(56) References Cited

U.S. PATENT DOCUMENTS 4,649,616 A * 3/1987 Bricker et al. .................. 29/406
7,410,303 B2 8/2008 Sakurai

FOREIGN PATENT DOCUMENTS

| CN | 1596184 A | 3/2005 |
| CN | 101491927 A | 10/2012 |
| JP | H3-291606 A | 12/1991 |
| JP | 2004-62100 A | 2/2004 |
| TW | 200942399 A | 10/2009 |

* cited by examiner

*Primary Examiner* — Joseph S Del Sole
*Assistant Examiner* — John Robitaille
(74) *Attorney, Agent, or Firm* — Novak Druce Connolly Bove + Quigg LLP

(57) ABSTRACT

A mold for molding optical fiber connector includes a core pin, a core mold and a cavity mold. The core pin has insertion portion and a blind hole forming portion. The core mold is used to clamp the insertion portion of the core pin. The cavity mold includes a molding cavity and a through hole defined in the sidewall of the cavity mold, the molding cavity includes a lens forming portion used to mold the lens. A positioning block defining an aligning hole is positioned in the through hole, the aligning hole is used to clamp the blind hole forming portion of the core pin to make the blind hole forming portion align with the lens forming portion during the injection molding process. The present art also relate to a method for adjusting the mold.

5 Claims, 4 Drawing Sheets

MOLD FOR FORMING OPTICAL FIBER CONNECTOR

BACKGROUND

1. Technical Field

The present disclosure relates to molds and molding methods, and particularly, to a mold for molding optical fiber connectors and a molding method for the same.

2. Description of Related Art

Optical fiber connectors typically include a lens and a blind hole behind the lens. The blind hole receives an optical fiber. The lens receives and guide light from the optical fiber. The alignment accuracy between the blind hole and the lens is very important to the optical transmission ability of the optical fiber connectors.

The injection molding is a current molding method for molding the optical fiber connectors. The mold used in the injection molding includes a core pin used to mold the blind hole and a lens forming portion corresponding with the core pin. During the injection molding method, the core pin must be kept in alignment with the lens forming portion to make sure of the alignment accuracy between the blind hole and the lens of the molded optical fiber connector.

However, the central axis of the blind hole usually deviates from the central axis of the lens in the optical fiber connector made by the above-mentioned method. The reason includes following points. First, the thermal expansion of the mold during the injection molding method can cause an axial offset between the longitudinal axis of the core pin and the central axis of the lens forming portion (the central axis of the lens forming portion coincides with an optical axis of the molded lens.). Second, the impact of the molding material during the molding method will cause the core pin to bend, thus causing an deviation angle between the longitudinal axis of the core pin and the central axis of the lens forming portion.

Therefore, a mold for forming optical fiber connectors and a method for making the mold, which can overcome the above-mentioned problems, is needed.

DETAILED DESCRIPTION

Figure 1:
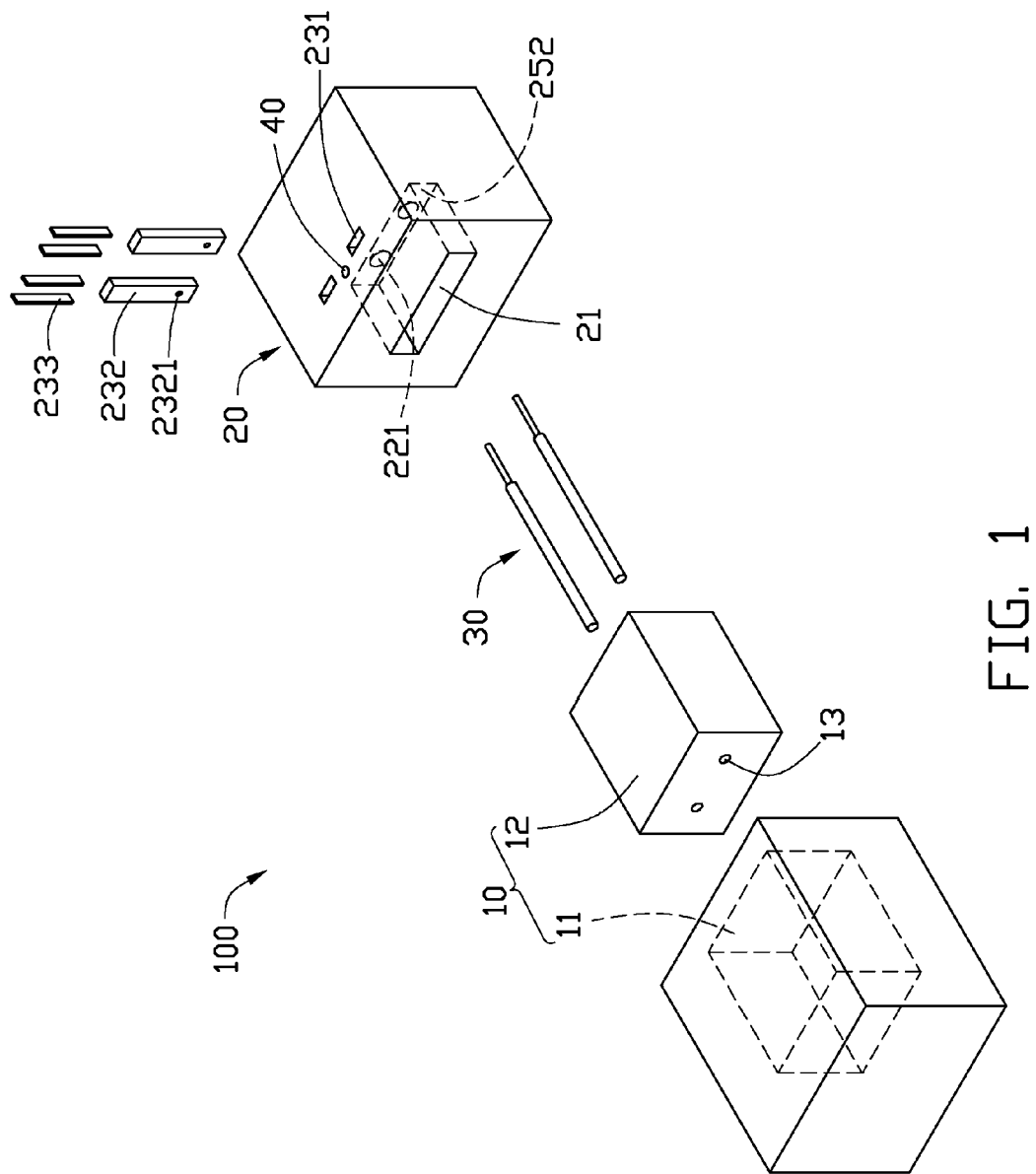
FIG. 1 is an exploded view of a mold for molding an optical fiber connector, according to an exemplary embodiment.
Figure 2:
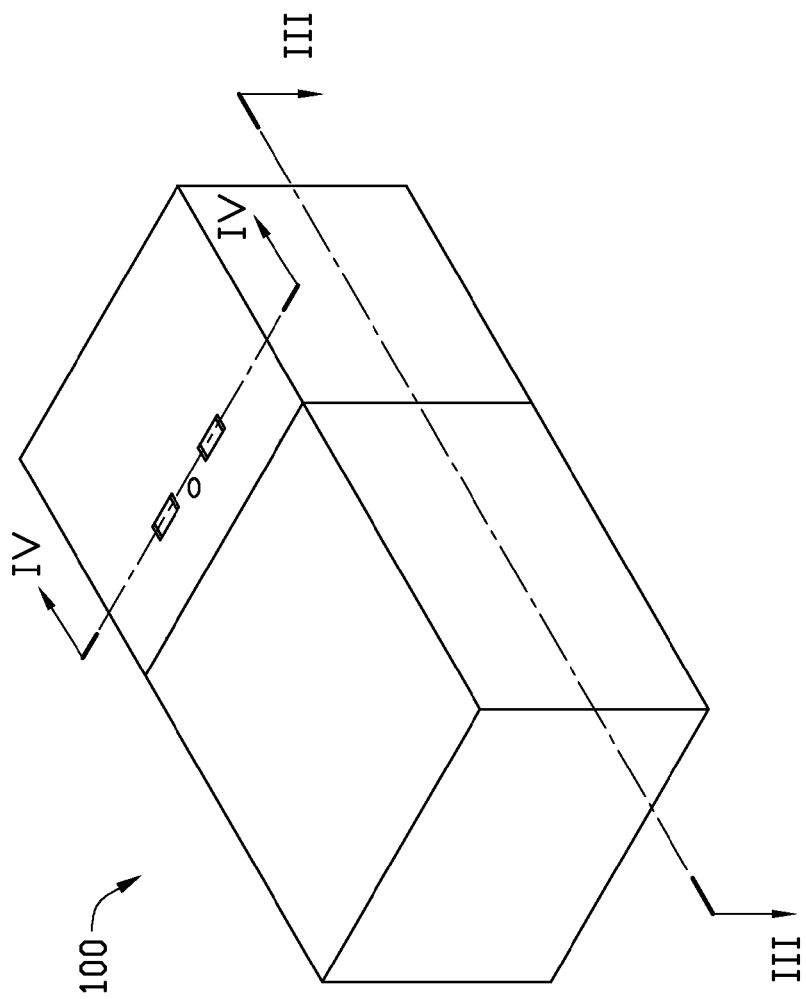
FIG. 2 is an assembled view of the mold of FIG. 1.
Figure 3:
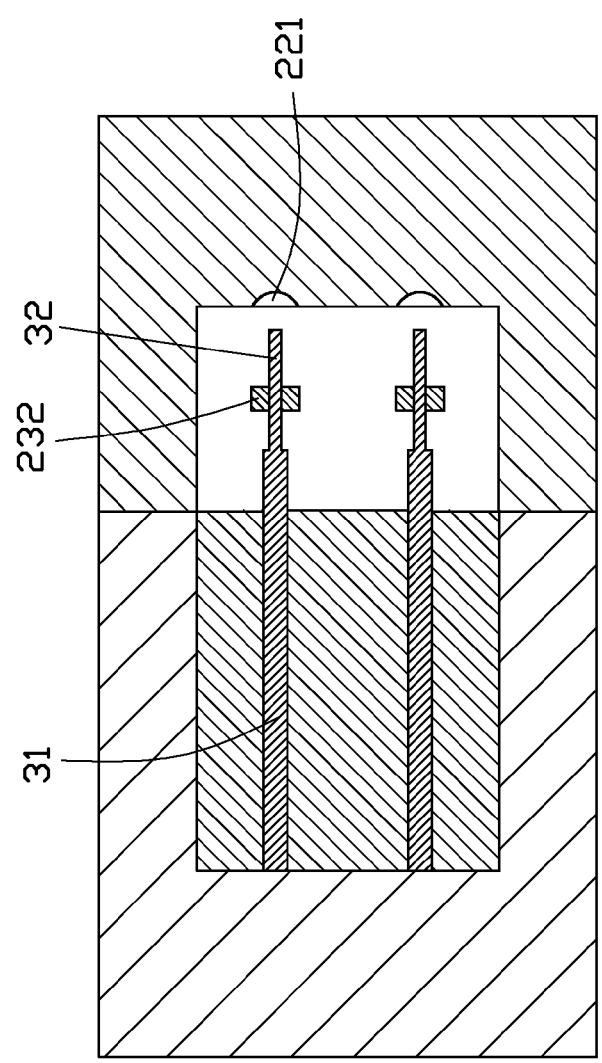
FIG. 3 is a sectional view taken along line III-III of the mold of FIG. 2.
Figure 4:
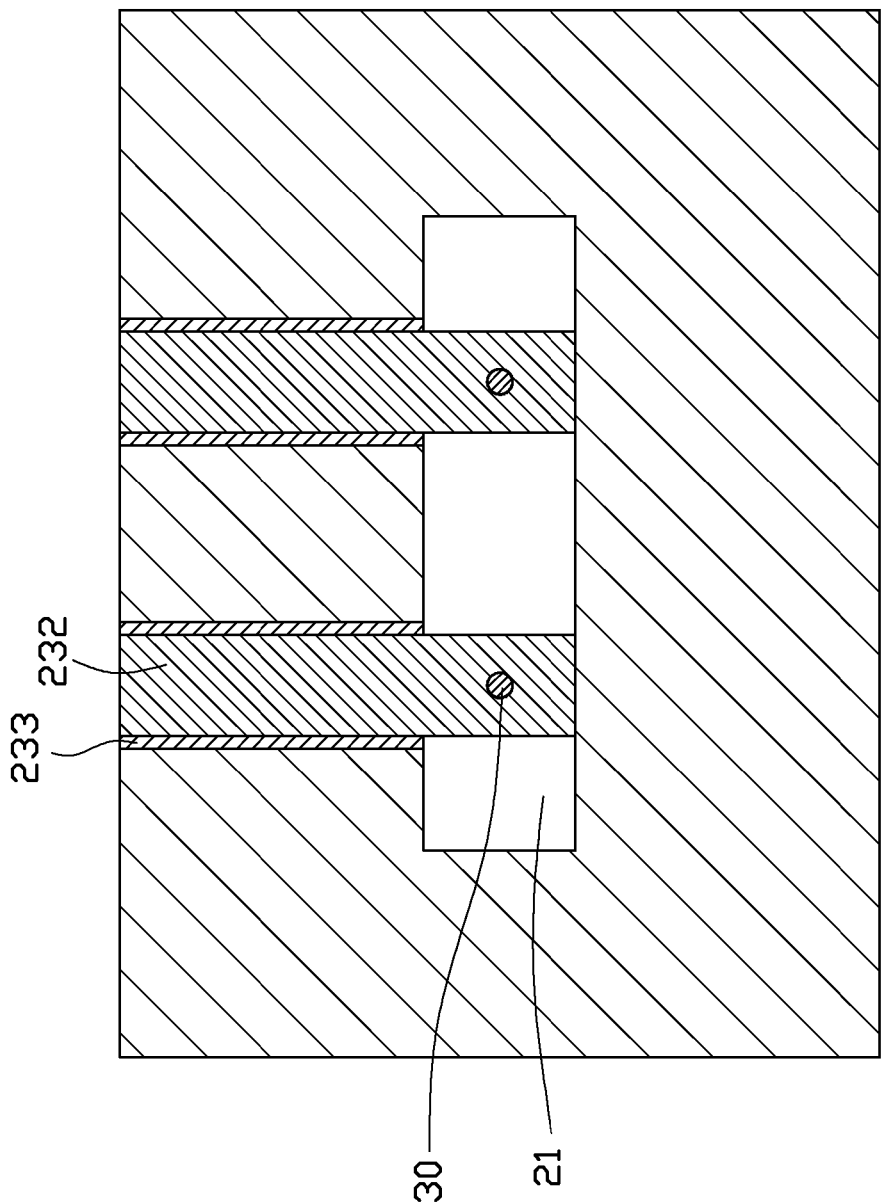
FIG. 4 is a sectional view taken along line IV-IV of the mold of FIG. 2.

Referring to FIGS. 1 to 4, a mold 100, according to an exemplary embodiment, is used to mold an optical fiber connector (not shown), the optical fiber connector includes blind holes and lenses.

The mold 100 includes a core mold 10, a cavity mold 20 and two core pins 30. The core pin 30 includes an insertion portion 31 and a blind hole forming portion 32. The blind hole forming portion 32 is used to mold the blind hole of the optical fiber connector.

The cavity mold 20 includes a molding cavity 21. The molding cavity 21 includes a support surface 22. The support surface 22 defines two lens forming portions 221. The lens forming portion 221 forms the lens of the optical fiber connector. After the mold 100 is assembled, the insertion portion 31 of the core pin 30 is fixed by the core mold 10 and the blind hole forming portion 32 of the core pin 30 stretches into the molding cavity 21 and aligns with the lens forming portion 221.

The cavity mold 20 also defines two through holes 231 in the side wall thereof corresponding with the two lens forming portions 221. The central axis of each through holes 231 is perpendicular to the central axis of the lens forming portion 221. A adjusting block 232 is positioned in the each through hole 231. Each adjusting block 232 defines an aligning hole 2321. The aligning hole 2321 clamps the blind hole forming portion 32 to make the blind hole forming portion 32 align with the corresponding lens forming portion 221.

Further, a shim 233 is positioned between the side wall of the through holes 231 and the adjusting block 232. A change of the thickness of the shim 233 can adjust the alignment between the longitudinal axis of the core pin 30 and the central axis of the lens forming portion 221.

The core mold 10 includes a receiving chamber 11 and a positioning block 12. The positioning block 12 is removably mounted in the receiving chamber 11. The positioning block 12 defines two holes 13 corresponding with the two lens forming portion 221 of the cavity mold 20. The hole 13 is used to hold the insertion portion 31 of the core pin 30 so that the core pin 30 aligns with the corresponding lens forming portion 221. The positioning block 12 can be redesigned (or replaced) if adjustment of the alignment between the central axis of the hole 13 and the central axis of the corresponding lens forming portion 221 is needed. In present embodiment, the hole 13 is a blind hole. It is to be understood that in alternative embodiments, the holes 13 may be through holes and the number of the holes 13 may be different and depends on the pattern of the optical fiber connector molded by the mold 100.

The mold 100 also includes a sprue hole 40 used to allow the molding material go into the molding cavity 21.

During molding the optical fiber connector using the mold 100, the mold 100 can be adjust according to below steps. First, a preform of the optical fiber connector is molded using the mold 100. The preform includes a blind hole and a lens aligned with the blind hole.

Second, the alignment accuracy between the blind hole and the lens of the preform is tested to determine whether the alignment accuracy of the preform is satisfactory or not. A satisfactory alignment accuracy includes two aspects. One aspect is that the blind hole and the lens of the preform are aligned exactly. The other aspect is that the axial offset and/or the deviation angle exist(s) between the central axis of the blind hole and the central axis of the lens of the preform, but are/is acceptable. If the alignment accuracy of the preform is satisfactory, the optical fiber connector can be molded using the mold 100.

Third, if the alignment accuracy of the preform is not satisfactory, the mold 100 is adjusted according the test results. Specifically, to adjust the axial offset between the central axis of the blind hole and the central axis of the lens, a redesigned positioning block 12 is provided according to the test results to replace the prior one, and new holes are defined in the redesigned positioning block 12. The new hole is defined in such fashion that the central axis of the new hole is moved opposite to the direction of the axial offset occurring with a distance coinciding with the value of the axial offset, compared with the central axis of the hole defined in the prior block. To adjust the deviation angle of the central axis of the blind hole relative to the central axis of the lens, the thickness of the shim 233 is changed to move the adjusting block 232 clamping the blind hole forming portion 32 along a direction, which is opposite to the direction of the inclination occurring, to compensate the inclination of the blind hole forming portion 32 caused by the impact of the molding material in the later injection molding step. In this way, in a later injection molding step, the axial offset and/or deviation angle can be eliminated or at least reduced to be acceptable.

The adjusted mold is used to mold the optical fiber connector.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold for molding an optical fiber connector, the optical fiber connector including a blind hole and a lens aligned with the blind hole, the mold comprising:
    a core pin including an insertion portion and a blind hole forming portion;
    a core mold including a receiving chamber and a positioning block removably received in the receiving chamber, the positioning block defining a hole receiving the insertion portion of the core pin;
    a cavity mold attached to the core mold, the cavity mold and the core mold cooperatively defining a molding cavity for forming the optical fiber connector, the cavity mold including a lens forming portion in the molding cavity and a through hole defined in a sidewall thereof in communication with the molding cavity, the core pin configured to be aligned with the lens forming portion, the blind hole forming portion of the core pin totally received in the molding cavity, an adjusting block engaged in the through hole, the lens forming portion configured for forming the lens, the through hole opening toward the blind hole forming portion, the adjusting block defining an aligning through hole for extension of the blind hole forming portion therethrough, the adjusting block configured to position the blind hole forming portion and maintain alignment between the blind hole forming portion and the lens forming portion during an injection molding process.

2. The mold of claim 1, further comprising a shim positioned in the through hole.

3. The mold of claim 1, wherein the hole defined in the positioning block is a blind hole.

4. The mold of claim 1, wherein the hole defined in the positioning block is a through hole.

5. The mold of claim 1, wherein the lengthwise direction of the through hole is perpendicular to the lengthwise direction of the core pin.

* * * * *